United States Patent
Hsieh et al.

(10) Patent No.: US 10,964,050 B2
(45) Date of Patent: Mar. 30, 2021

(54) METHOD FOR IDENTIFYING FOREGROUND OBJECT IN IMAGE AND ELECTRONIC DEVICE

(71) Applicant: Wistron Corporation, New Taipei (TW)

(72) Inventors: Chia-Ta Hsieh, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 106 days.

(21) Appl. No.: 16/296,170

(22) Filed: Mar. 7, 2019

(65) Prior Publication Data

US 2020/0184673 A1   Jun. 11, 2020

(30) Foreign Application Priority Data

Dec. 11, 2018   (TW) .................. 107144648

(51) Int. Cl.
*G06T 7/73* (2017.01)
*G06T 7/90* (2017.01)
*G06T 7/10* (2017.01)

(52) U.S. Cl.
CPC .................. *G06T 7/73* (2017.01); *G06T 7/10* (2017.01); *G06T 7/90* (2017.01)

(58) Field of Classification Search
CPC .... G06T 7/73; G06T 7/10; G06T 7/90; G06K 9/62
See application file for complete search history.

(56) References Cited

U.S. PATENT DOCUMENTS

| 8,873,835 | B2 | 10/2014 | Asente et al. |
| 9,224,060 | B1 | 12/2015 | Ramaswamy |
| 10,445,890 | B2 | 10/2019 | Wang et al. |
| 2009/0003687 | A1 | 1/2009 | Agarwal et al. |
| 2018/0357775 | A1 | 12/2018 | Wang et al. |

FOREIGN PATENT DOCUMENTS

| CN | 102075779 | * 5/2011 | .............. H04N 13/00 |
| WO | WO2017091927 | * 11/2015 | .............. G06T 7/00 |
| WO | 2017091927 | 6/2017 | |

OTHER PUBLICATIONS

"Office Action of Taiwan Counterpart Application," dated Oct. 5, 2019, p. 1-p. 13.

* cited by examiner

*Primary Examiner* — Myron Wyche
(74) *Attorney, Agent, or Firm* — JCIPRNET

(57) ABSTRACT

A method for identifying a foreground object in an image and an electronic device are provided. The method includes: dividing a first image and a second image to obtain first image blocks in the first image and second image blocks in the second image; comparing the first image blocks with the second image blocks to obtain a plurality of disparity values respectively corresponding to the first image blocks, and generating a disparity image including the disparity values; comparing each disparity value in the disparity image with a first threshold to form a disparity depth image, and selecting a selected block from the disparity depth image to form a first region; and mapping the first region into the first image to identify a mapped object and identify the object as a foreground object.

17 Claims, 10 Drawing Sheets

600

700

METHOD FOR IDENTIFYING FOREGROUND OBJECT IN IMAGE AND ELECTRONIC DEVICE

CROSS-REFERENCE TO RELATED APPLICATION

This application claims the priority benefit of Taiwan application serial no. 107144648, filed on Dec. 11, 2018. The entirety of the above-mentioned patent application is hereby incorporated by reference herein and made a part of this specification.

BACKGROUND OF THE INVENTION

1. Field of the Invention

The present invention relates to an image identifying method, and in particular, to a method for identifying a foreground object in an image by using image division and disparity values, and an electronic device.

2. Description of Related Art

At present, a specific object, such as a face, a palm, a vehicle or a pedestrian, is commonly detected from an image by using a method of a classifier, a deep learning model, or the like. The detection on the specific object usually needs to operate the entire image, which costs a lot of time. Although the operating rate may be promoted with a graphic processing unit (GPU) (for example, using parallel operation), the hardware requirements are quite high, and not every computer is available. Therefore, an alternative method may be first obtaining a foreground object in the image, and then inputting the foreground object to the classifier or the deep learning model for identification. For example, a manner of acquiring the foreground object in the image is that the foreground object may be first obtained by using a depth lens, and then the foreground object is detected. However, the computation of the depth of the image usually requires a large computation amount, and also costs a lot of time.

SUMMARY OF THE INVENTION

The present invention provides a method for identifying a foreground object in an image and an electronic device, to identify the foreground object in the image quickly with a small computation amount.

An embodiment of the present invention provides a method for identifying a foreground object in an image, applied to an electronic device. The method includes: obtaining a first image corresponding to a first viewing angle and a second image corresponding to a second viewing angle from an image capture device, the first viewing angle being different from the second viewing angle; dividing the first image and the second image according to a first size of a first region of interest to obtain a plurality of first image blocks in the first image and a plurality of second image blocks in the second image; comparing the plurality of first image blocks with the plurality of second image blocks to obtain a plurality of disparity values respectively corresponding to the plurality of first image blocks, and generating a disparity image including the plurality of disparity values; comparing each of the plurality of disparity values in the disparity image with a first threshold to form a disparity depth image, and selecting at least one selected block, of which the disparity value is greater than or equal to the first threshold, from the disparity depth image to form a first region; and mapping the first region into the first image to identify a mapped object and identify the object as a foreground object.

An embodiment of the present invention provides an electronic device. The electronic device includes a processor, and the processor is configured to execute the following operations: obtaining a first image corresponding to a first viewing angle and a second image corresponding to a second viewing angle from an image capture device, the first viewing angle being different from the second viewing angle; dividing the first image and the second image according to a first size of a first region of interest to obtain a plurality of first image blocks in the first image and a plurality of second image blocks in the second image; comparing the plurality of first image blocks with the plurality of second image blocks to obtain a plurality of disparity values respectively corresponding to the plurality of first image blocks, and generating a disparity image including the plurality of disparity values; comparing each of the plurality of disparity values in the disparity image with a first threshold to form a disparity depth image, and selecting at least one selected block, of which the disparity value is greater than or equal to the first threshold, from the disparity depth image to form a first region; and mapping the first region into the first image to identify a mapped object and identify the object as a foreground object.

An embodiment of the present invention provides an electronic device. The electronic device includes an image capture device, an image division module, a disparity comparison module and a foreground object identification module. The image capture device is configured to capture images of an object to obtain a first image corresponding to a first viewing angle and a second image corresponding to a second viewing angle, the first viewing angle being different from the second viewing angle. The image division module is configured to divide the first image and the second image according to a first size of a first region of interest to obtain a plurality of first image blocks in the first image and a plurality of second image blocks in the second image. The disparity comparison module is configured to compare the plurality of first image blocks with the plurality of second image blocks to obtain a plurality of disparity values respectively corresponding to the plurality of first image blocks, and generate a disparity image including the plurality of disparity values. A disparity depth image forming module is configured to compare each of the plurality of disparity values in the disparity image with a first threshold to form a disparity depth image, and select at least one selected block, of which the disparity value is greater than or equal to the first threshold, from the disparity depth image to form a first region. The foreground object identification module is configured to map the first region into the first image to identify a mapped object and identify the object as a foreground object.

Based on the foregoing, the method for identifying a foreground object in an image according to the present invention may divide the image by using a region of interest of a predetermined size, generate a disparity depth image by means of disparity values, and then map the image to the original image to quickly obtain an approximate location of the foreground object in the image. If needed, according to a found foreground of the disparity depth image and a region formed by extending blocks around the foreground, the region may be then divided with a region of interest of a smaller size, and then a more accurate foreground object is obtained by means of disparity values. Therefore, the method for identifying a foreground object in an image according to the present invention may identify the foreground object in the image quickly.

In order to make the aforementioned and other objectives and advantages of the present invention comprehensible, embodiments accompanied with figures are described in detail below.

DESCRIPTION OF THE EMBODIMENTS

Figure 1:
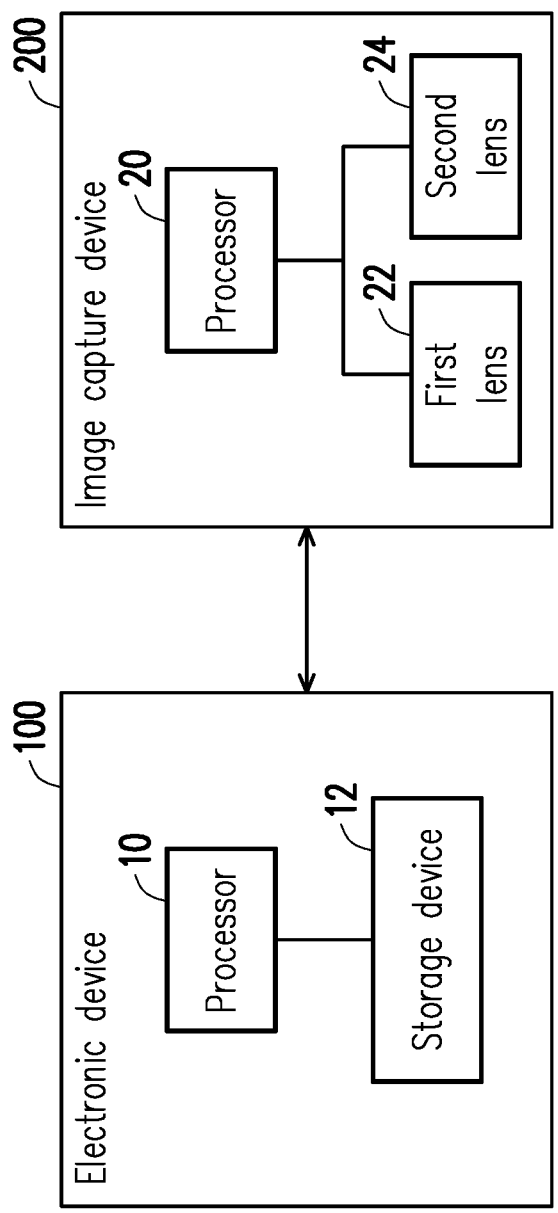
FIG. 1 is a schematic diagram of an electronic device and an image capture device according to an embodiment of the present invention.

Reference will now be made in detail to the exemplary embodiments of the present invention, examples of which are illustrated in the accompanying drawings. Wherever possible, elements/components using same reference numbers in the drawings and implementations represent same or similar parts.

FIG. 1 is a schematic diagram of an electronic device and an image capture device according to an embodiment of the present invention.

Referring to FIG. 1, an electronic device 100 includes a processor 10 and a storage device 12. The storage device 12 is coupled to the processor 10. The electronic device 100 is, for example, a mobile phone, a tablet computer, a notebook computer, a television, a game machine, a virtual reality device or other electronic device, and is not limited herein.

The processor 10 may be a central processing unit (CPU), or another programmable general-purpose or special-purpose microprocessor, a digital signal processor (DSP), a programmable controller, an application specific integrated circuit (ASIC) or another similar component, or a combination of the above components.

The storage device 12 may be any type of a fixed or movable random access memory (RAM), a read-only memory (ROM), a flash memory, a hard disk drive (HDD), a solid-state drive (SSD) or a similar component, or a combination of the above components.

In the present exemplary embodiment, the storage device 12 of the electronic device 100 stores a plurality of program code segments, and the program code segments are executed by the processor 10 of the electronic device 100 after being installed. For example, the storage device 12 of the electronic device 100 includes a plurality of software modules, and respective operations of the electronic device 100 are respectively executed by using the software modules. Each software module includes one or more program code segments. However, the present invention is not limited thereto, and each of the above operations may be implemented in the form of other hardware or firmware.

An image capture device 200 includes a processor 20, a first lens 22 and a second lens 24. The first lens 22 and the second lens 24 are directly or indirectly coupled to the processor 20 respectively. The processor 20 may be a component identical or similar to the processor 10, and the descriptions thereof are omitted herein. In an embodiment, the processor 20 may not be disposed in the image capture device 200, but the first lens 22 and the second lens 24 are directly or indirectly coupled to the processor 10; alternatively, the processor 10 and the processor 20 may be integrated into a single processor. The specification distinguishes the processor 10 and the processor 20 merely as an exemplary embodiment, and is not intended to limit the number and an operation manner of the processors.

The first lens 22 and the second lens 24 are, for example, charge coupled device (CCD) lenses, or complementary metal oxide semiconductor transistor (CMOS) lenses. In the present exemplary embodiment, the first lens 22 and the second lens 24 are configured on the same horizontal line in the image capture device 200 and are configured to simultaneously shoot a scenario. The first lens 22 is, for example, a left lens and is configured to shoot the scenario to generate a left eye object image (abbreviated as a left image). The second lens 24 is, for example, a right lens and is configured to shoot the scenario to generate a right eye object image (abbreviated as a right image). The processor 20 (and/or the processor 10) may obtain depth information of each pixel in the left image (or the right image) according to the shot left image and right image. It should be noted that in other embodiments, the first lens 22 may also be a right lens and the second lens 24 may also be a left lens.

The following describes a method for identifying a foreground object in an image according to the present invention through multiple steps.

Step of Inputting Images

In the step of inputting images, the first lens 22 may shoot a scenario at a first viewing angle (for example, a viewing angle of the left eye) to obtain a left image (also referred to as a first image). The second lens 24 may shoot the aforementioned scenario at a second viewing angle (for example, a viewing angle of the right eye) to obtain a right image (also referred to as a second image). Thereafter, the processor 10 may obtain the first image and the second image in a wired or wireless manner. The present invention is not intended to limit how the processor 10 obtains the first image and the second image shot by the image capture device 200.

Step of Defining a Region of Interest

Then, the step of defining a region of interest is mainly used to correspondingly define the size of a region of interest for the size of an object to be detected (that is, a foreground object) in an image, but actually the size of the region of interest does not have to be exactly equal to the size of the object to be detected. It may be determined or adjusted by empirical values, and may be greater or less than the size of the object to be detected. For example, when a palm is to be detected within two meters away from the image capture device 200 (that is, an object appearing within two meters is assumed as a foreground object), a user needs to pre-define how many pixels the length and width of a region of interest that may encompass or mostly cover the farthest and smallest palm within a foreground range in a shot image have. It is assumed herein that the size of the region of interest that is able to encompass or mostly cover the palm at two meters in the image is 50*50 pixels. It should be noted that this step may be executed before or after the step of inputting images, which is not limited herein. For ease of explanation, the region of interest defined in this step may also be referred to as a first region of interest, and the size of the first region of interest is also referred to as a first size.

Step of Cutting Images

Next, in the step of cutting images, the processor 10 divides the first image shot by the first lens 22 and the second image shot by the second lens 24 according to the first size of the first region of interest to obtain a plurality of blocks in the first image (also referred to as first image blocks) and a plurality of blocks in the second image (also referred to as second image blocks).

In more detail, continuing the example of the palm in the aforementioned image detection, it is assumed that the first image and the second image both have the size of 500*500 pixels. Since the first size is 50*50 pixels, the processor 10 may equally divide the first image into 100 first image blocks and equally divide the second image into 100 second image blocks. In other words, the length of the first image may be equally divided into 10 equal parts according to the first size and the width of the first image may be equally divided into 10 equal parts according to the first size; and the length of the second image may be equally divided into 10 equal parts according to the first size and the width of the second image may be equally divided into 10 equal parts according to the first size.

However, it should be noted that in an embodiment, the first size may not be able to equally divide the length and width of the first image and the length and width of the second image. In more detail, FIG. 2A and FIG. 2B are schematic diagrams indicating that the first size cannot equally divide the length and width of the first image and the length and width of the second image according to an embodiment of the present invention.

Figure 2A:
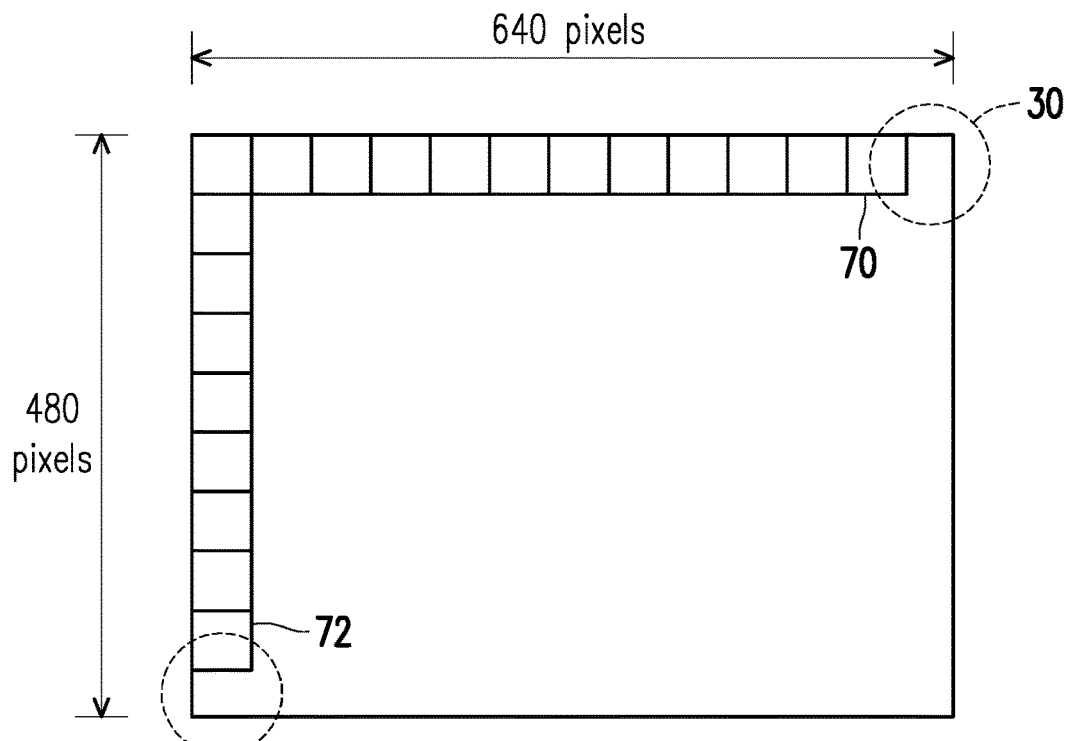
FIG. 2A and FIG. 2B are schematic diagrams indicating that the first size is not able to equally divide the length and width of a first image and the length and width of a second image according to an embodiment of the present invention.
Figure 2B:
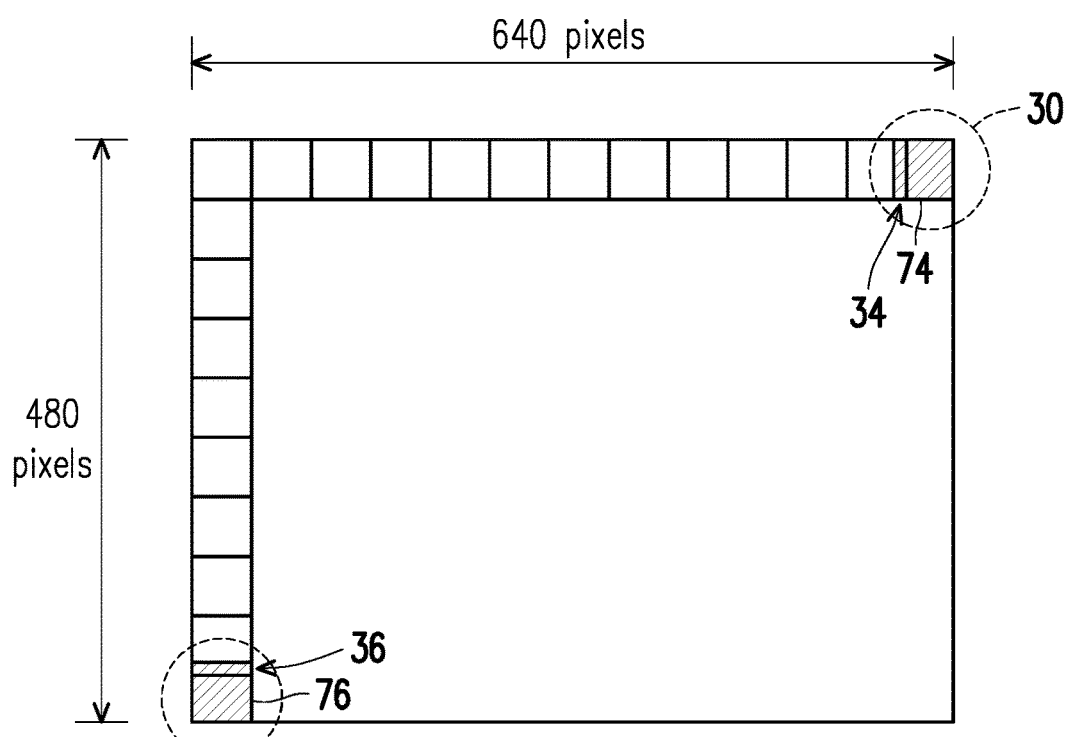

Referring to FIG. 2A, using the first image as an example herein, the size of the first image is assumed to be 640*480 pixels. When the first image of FIG. 2A is divided with the aforementioned first size of 50*50 pixels, since the length and width of the first image cannot be exactly divided by the length and width of the first size respectively, as shown in FIG. 2A, when the first image is divided with the first size, the length of the first image may include the remaining pixels of the length that does not satisfy the first size at an imaginary circle 30, and the width of the first image may include the remaining pixels of the width that does not satisfy the first size at an imaginary circle 32. In order to resolve this problem, in the present embodiment, referring to FIG. 2B, the remaining pixels of the imaginary circle 30 may share part of pixels 34 with a last block 70 in FIG. 2A such that the remaining pixels in the original imaginary circle 30 are combined with the pixels 34 to just satisfy the length of the first size and generate a block 74 partially overlapping the block 70. Similarly, the remaining pixels of the imaginary circle 32 share part of pixels 36 with the last block 72 in FIG. 2A such that the remaining pixels in the original imaginary circle 32 are combined with the pixels 36 to just satisfy the width of the first size and generate a block 76 partially overlapping the block 72.

Based on the above manner, if the sizes of the first image and the second image are 640*480 pixels respectively and when the first image and the second image are divided with the aforementioned first size of 50*50 pixels, 13*10 blocks are respectively obtained for the first image and the second image.

Step of Computing Disparity Values

Then, in the step of computing disparity values, the processor 10 compares the aforementioned first image blocks and second image blocks to obtain disparity values of each of the blocks in the first image relative to the corresponding blocks in the second image.

Figure 3:
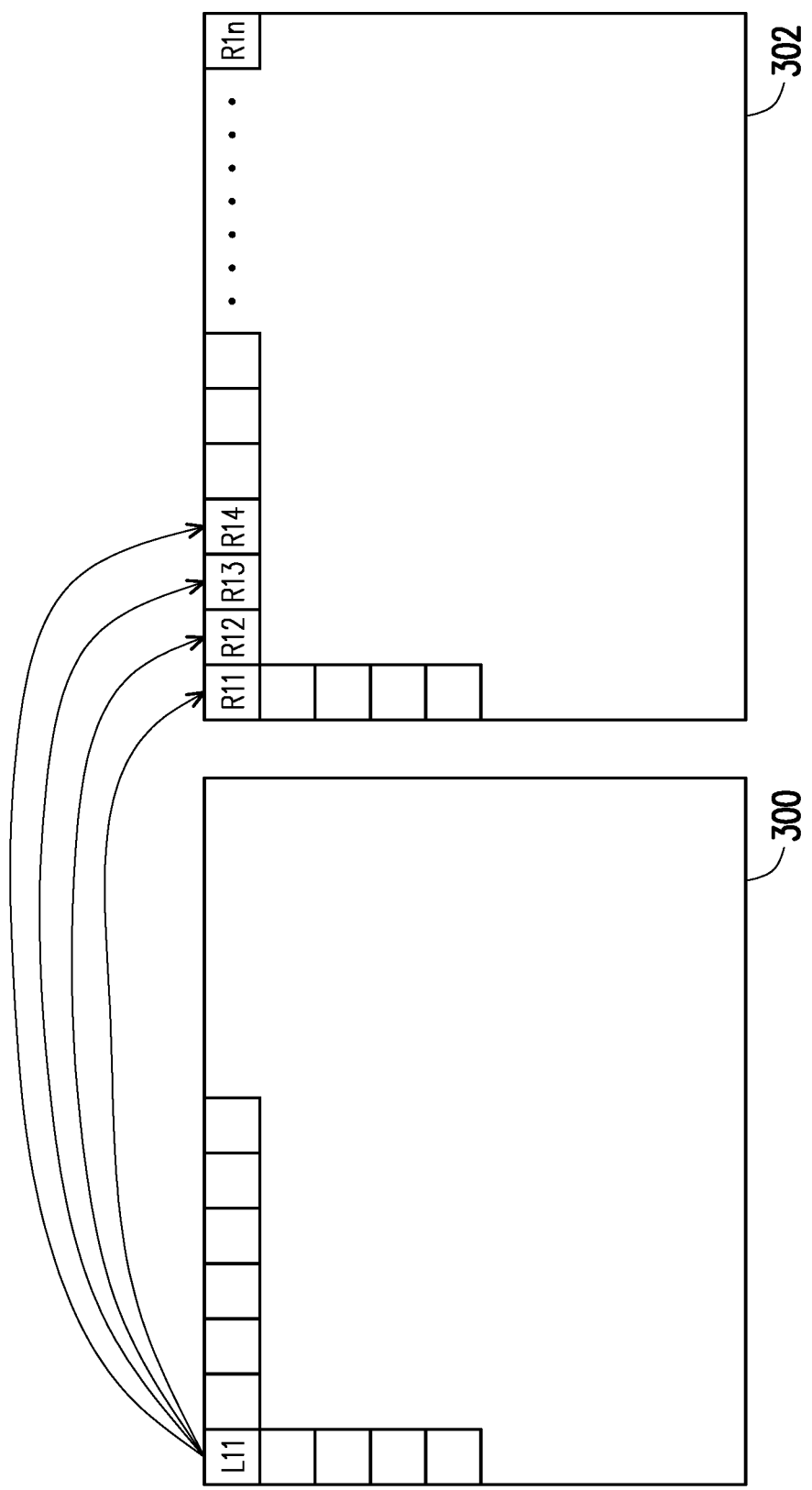
FIG. 3 is a schematic diagram of computing disparity values according to an embodiment of the present invention.

For example, FIG. 3 is a schematic diagram of computing disparity values according to an embodiment of the present invention.

Referring to FIG. 3, computing the disparity value of a block L11 of a first image 300 is used as an example. The processor 10 first computes and obtains block information of the block L11. The block information is, for example, an average value of grey-scale values, a sum of grey-scale values or colours value of a colour space (for example, three RGB channels) of all pixels in the block L11. Next, the processor 10 compares the block information of the block L11 with that of blocks R11 to R1$n$ of the same row (for example, a first row) at a position (also referred to as a first position) at which the block L11 is located in a second image 302 one by one to select a most similar block, that is, a difference between the block information of the most similar block and the block information of the block L11 (for example, a difference of grey-scale values or colour values) is smallest. In other words, a block R14 in the second image 302 is assumed to be the most similar block selected above, a difference between the block information of the block R14 and the block information of the block L11 (the difference of grey-scale values or colour values) may be less than a difference between the block information of other blocks except the block R14 in the second image 302 and the block information of the block L11 (the difference of grey-scale values or colour values).

Thereafter, the processor 10 obtains a disparity value of the block L11 according to the block L11 and the most similar block found as described above. The number of pixels between the block L11 and the most similar block in the same row is the disparity value of the block L11. That is to say, the block L11 and the most similar block R14 should be of the same object image, but the positions thereof in the first image 300 and the second image 302 deviate by the aforementioned disparity value.

For example, if the block R14 in the second image 302 is the most similar block selected, the block L11 is the first block in the first row of the first image 300, while R14 is the fourth block in the first row of the second image 302, the position difference of the first block and the fourth block in the same row is three blocks, and the length of each block is 50 pixels, so the first block is spaced apart from the fourth block by 150 pixels. That is to say, the disparity value of the block L11 is 150.

It needs to be noted that computing the disparity value of the block L11 above is only an example, the disparity values of other blocks in the first image 300 may also be obtained by a manner similar to the foregoing, and the descriptions thereof are omitted herein.

In particular, a conventional method for computing disparity values is to use a sliding window. If disparity values of all sliding windows in an image (for example, a first image) are to be obtained, since one sliding window needs to be compared with all sliding windows in the same row of another image (for example, a second image), the sliding window needs to be compared for 640 times; and for the total computation amount, 640*640*480 times of computation are required to obtain the disparity values of all the sliding windows. However, the disparity value of each block is computed based on blocks in the present invention. When the disparity values of 13*10 blocks formed by the aforementioned first image of the 640*480 size are computed, since one block of the first image only needs to be compared with all blocks in the same row of the second image, the block needs to be compared only for 13 times. For the total computation amount, the disparity values of all the blocks may be obtained by only 13*13*10 times of computation. Therefore, the block-based disparity computation method of the present invention may be more efficient than the pixel-based disparity computation method.

Step of Defining a Foreground

After the disparity values of all the blocks in the first image 300 are computed, a disparity image including a plurality of disparity blocks (the number and position thereof are the same as those of the blocks in the aforementioned divided image) is generated, that is, each block has a disparity value computed as described above. The processor 10 compares the disparity value of each disparity block in the aforementioned disparity image with a first threshold. For example, the disparity block is marked as 0 (black) if the disparity value is less than the first threshold, and marked as 1 (white) if the disparity value is greater than or equal to the first threshold to generate a disparity depth image. Therefore, at least one block (also referred to as a selected block) may be selected therefrom. That is to say, the disparity values of the selected blocks are all greater than or equal to the first threshold and all the selected blocks jointly form a first region. The first region may be regarded as a foreground in the disparity depth image.

Figure 4A:
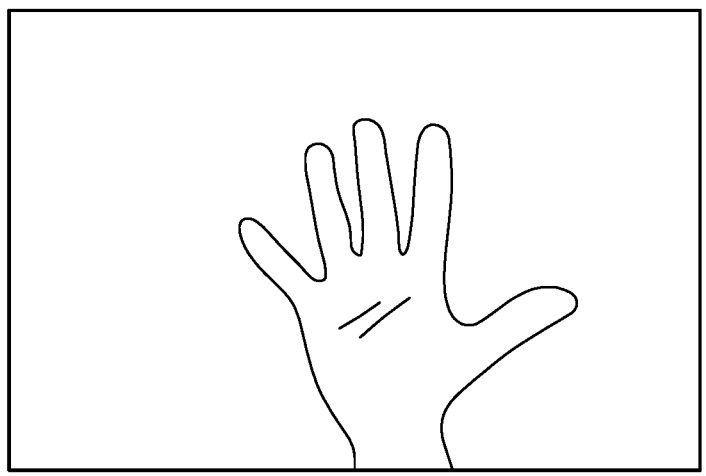
FIG. 4A to FIG. 4C are schematic diagrams of selecting selected blocks based on disparity values according to an embodiment of the present invention.
Figure 4B:
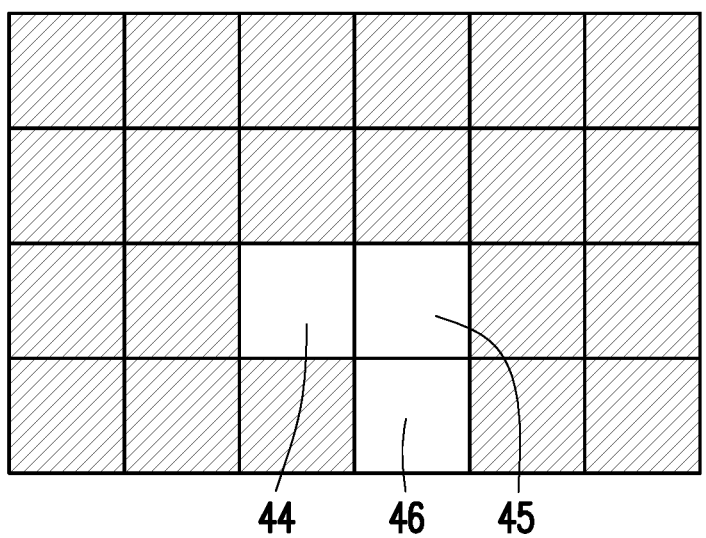
Figure 4C:
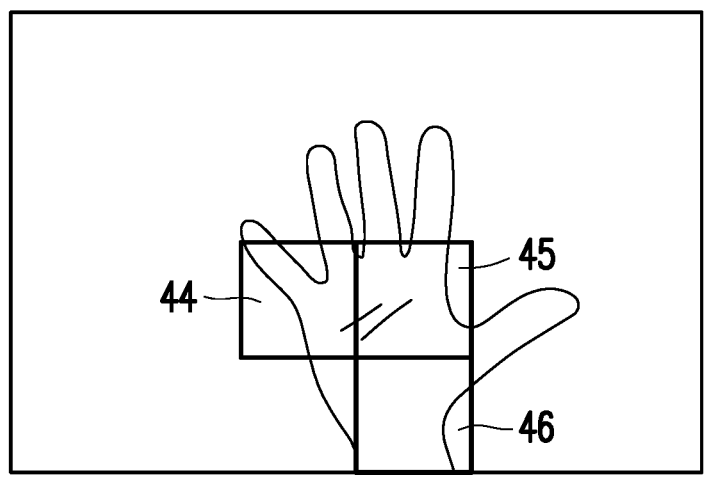

For example, FIG. 4A to FIG. 4C are schematic diagrams of selecting selected blocks based on disparity values according to an embodiment of the present invention. Referring to FIG. 4A to FIG. 4C, it is assumed that the first image 300 is an image shot by the first lens 22, and the first image 300 is divided into 6*4 blocks (that is, the aforementioned first image blocks) according to the first size of the aforementioned first region of interest. After a disparity depth image 400 is generated by computing the disparity values of the first image blocks, if only the disparity values of the disparity blocks 44 to 46 are greater than or equal to the first threshold, the disparity blocks 44 to 46 are selected as the aforementioned selected blocks. A white region formed by the selected blocks in FIG. 4B is the aforementioned first region regarded as the foreground.

Then, the first region regarded as the foreground is superimposed to the first image 300 by mapping to form a superimposed image 500 shown in FIG. 4C, and an object mapped by the first region is identified as a foreground object. (for example, the palm to be detected).

It should be stated herein that the first threshold may be computed by using the following formula (1):

$$\text{Threshold}=(\text{Baseline}/\text{Distance})*\text{Focus} \quad (1)$$

Threshold is the first threshold, Baseline is the lens spacing, Distance is the object distance, and Focus is the focal length. The lens spacing is the distance between the first lens 22 and the second lens 24. The focal length is a focal length used by the first lens 22 and the second lens 24 when shooting and obtaining the first image and the second image. The object distance is the distance between the object (for example, the aforementioned palm) to be identified as a foreground and the image capture device 200. In other words, the first threshold is equal to a quotient of a first value divided by the object distance, and the aforementioned first value is a product obtained by multiplying the lens spacing by the focal length.

In addition, a method for determining whether a block is the foreground may be shown in the following formula (2):

$$\text{Block}(x, y) = \begin{cases} \text{diparity}(x, y) & \text{if disparity}(x, y) \geq \text{Threshold} \\ 0 & \text{otherwise} \end{cases} \quad (2)$$

The disparity(x, y) is a disparity value of the block in the $x^{th}$ column and the $y^{th}$ row. When the value of disparity(x, y) is greater than or equal to the aforementioned first threshold (that is, threshold), the value of Block(x, y) is set to disparity(x, y). Conversely, when the value of disparity(x, y) is less than the aforementioned first threshold, the value of Block(x, y) is set to zero. Block(x, y) is used to determine whether the block in the $x^{th}$ column and the $y^{th}$ row is foreground. When Block(x, y) is non-zero, the block in the $x^{th}$ column and the $y^{th}$ row belongs to the foreground. When Block(x, y) is zero, the block in the $x^{th}$ column and the $y^{th}$ row does not belong to the foreground. The values of x and y are both positive integers.

It should be noted that in this step, the first region belonging to the foreground in the disparity depth image may be found and the first region is composed of the selected blocks. However, the aforementioned first size used to divide the first image to generate the first region of interest of the first image blocks may affect the accuracy in obtaining the foreground object in some cases. In the example of FIG. 4C, the first size is originally adapted to the palm at the farthest extent of the foreground while the palm image is small, but the palm in FIG. 4C is close to the image capture device 200 and therefore is larger, so when the first image is divided with the larger first size, the finally obtained foreground object belonging to the palm may have only the center of the palm, but the part belonging to fingers (for example, the thumb, the index finger, the middle finger and the ring finger in FIG. 4C) in the palm may be incorrectly determined as a part of a non-foreground object (that is, background).

That is to say, if the first image is divided with the aforementioned larger first size, the disparity values of the respective blocks may be computed quickly and the blocks belonging to the foreground may be found. However, in some cases, this method may also cause the part of the first image belonging to the foreground to be incorrectly determined as a non-foreground. That is to say, when the first size is large, the obtained foreground object may be inaccurate in some cases. In comparison, when the first size is small, the foreground obtained in most cases should be more accurate, but if the first size is too small, the number and time of operations of the processor increase correspondingly.

Therefore, a solution according to another embodiment of the present invention may continue to execute the following steps of redefining a region of interest, expanding a comparison region, re-cutting the images, re-computing the disparity values and redefining the foreground to regain a more accurate foreground in the first image.

Step of Redefining the Region of Interest

In the step of redefining the region of interest, the processor 10 adjusts a second size of a second region of interest according to the first size of the aforementioned first region of interest. The second size is used to regain the foreground object in the first image. Particularly, in the present exemplary embodiment, the second size is less than the first size, so the second size may be used to regain a more accurate foreground object in the first image.

In the present exemplary embodiment, the length and width of the second region of interest are respectively half of the length and width of the first region of interest. That is, the second size is ¼ of the first size.

Step of Expanding the Comparison Region

The part belonging to fingers (for example, the thumb, the index finger, the middle finger and the ring finger in FIG. 4C) in the superimposed image 500 of FIG. 4C is incorrectly determined as a part of a non-foreground object (that is, background). Therefore, in the step of expanding the comparison region, the processor 10 determines an extended region for newly searching for the foreground object in the first image according to the first region (that is, the foreground) found in the aforementioned superimposed image 500. The extended region refers to a region that is adjacent to the first region and that expands for a certain number of blocks outward (for example, upward/downward/leftward/rightward).

Figure 5A:
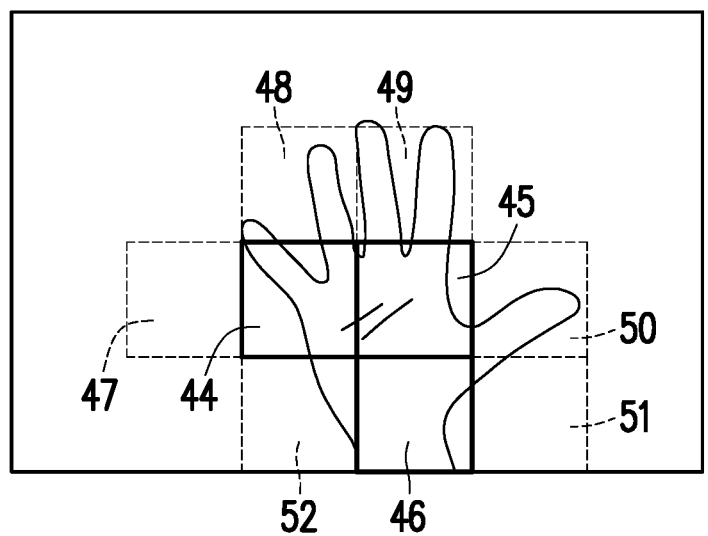
FIG. 5A and FIG. 5B are schematic diagrams of expanding a first region to generate an extended region according to an embodiment of the present invention.
Figure 5B:
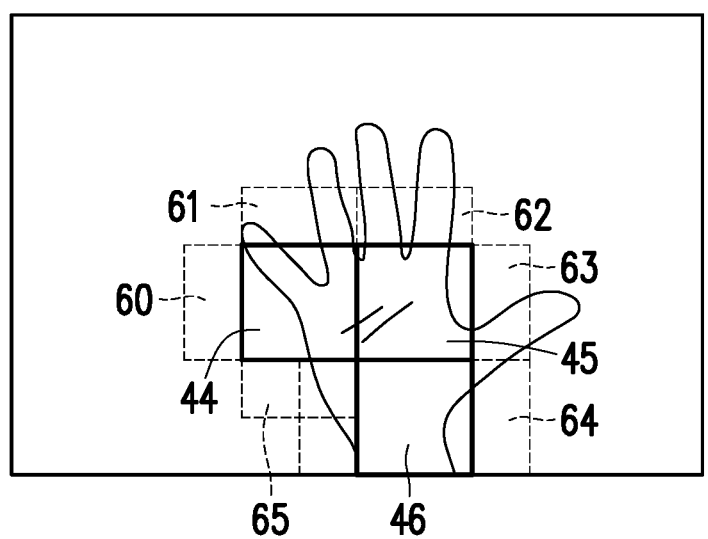

For example, FIG. 5A and FIG. 5B are schematic diagrams of expanding the first region to generate a new expanded first region according to an embodiment of the present invention.

Referring to FIG. 5A, continuing the example of FIG. 4A to FIG. 4C, the processor 10 may generate, for example, a plurality of extended blocks 47 to 52 that are adjacent to an edge of the first region including the disparity blocks 44 to 46 in the superimposed image 500 and have the same size as the disparity blocks 44 to 46 to form an extended region, and the extended region may be combined with the first region to form an expanded first region. That is to say, the expanded first region generated in this step includes the region mapped by the first region in the original first image, and the expanded first region is greater than the first region. In another embodiment, referring to FIG. 5B, it is also possible to generate only extended blocks of a smaller size as the extended region. For example, the edge of the first region including the disparity blocks 44 to 46 may be respectively expanded outward by half of the size of the aforementioned disparity blocks to obtain extended blocks 60 to 65.

In particular, the expanded first region generated in this step is mainly used to expand the search for and mapping of the foreground object that may also belong to the first image, so compared to searching the entire first image for the foreground object, the foreground object may still be found quickly by using the small and limited expanded first region to search for and map the foreground object in the first image again. In addition, a more accurate foreground object in the first image should be found with the second size of the smaller second region of interest.

Step of Re-Cutting the Images

After a range of the expanded first region of the superimposed image 500 is obtained, in the step of re-cutting the images, the processor 10 divides the expanded first region according to the aforementioned second size to obtain a plurality of new first image blocks.

Figure 6A:
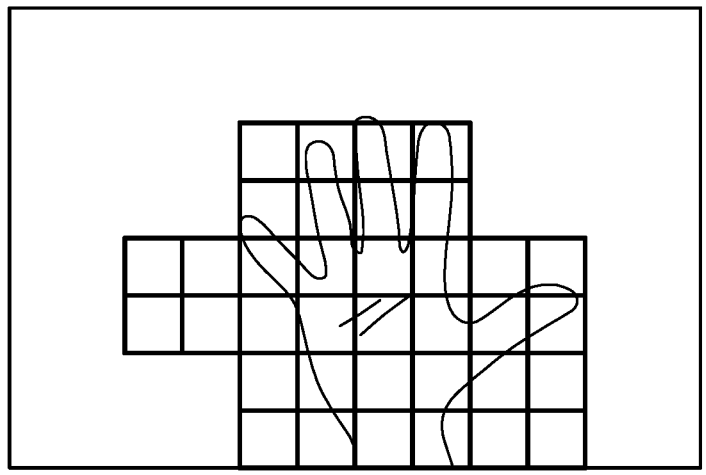
FIG. 6A and FIG. 6B are schematic diagrams of re-cutting images according to an embodiment of the present invention.
Figure 6B:
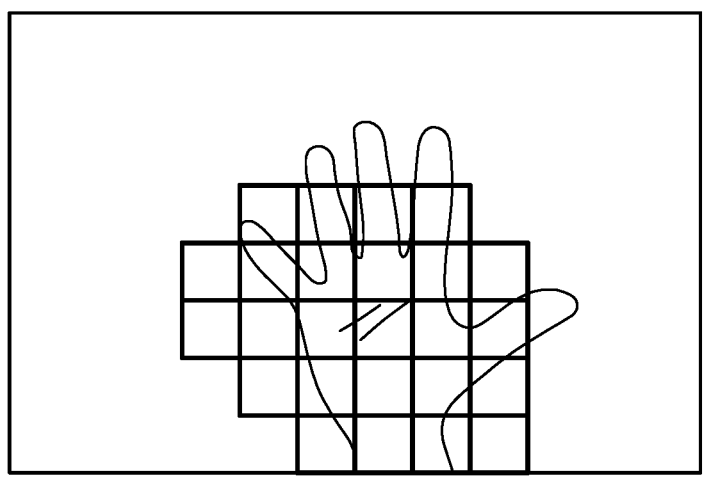

FIG. 6A and FIG. 6B are schematic diagrams of re-cutting the images according to an embodiment of the present invention.

Referring to FIG. 6A, if the processor 10 divides the expanded first region of FIG. 5A with the second size (that is, a quarter of the first size), a new first image 600 having 36 new first image blocks shown in FIG. 6A is generated after the division is completed. Alternatively, referring to FIG. 6B, if the processor 10 divides the expanded first region in FIG. 5B with the second size (that is, a quarter of the first size), a new first image 700 having 25 new first image blocks shown in FIG. 6B is generated after the division is completed. Similarly, the second image may also be divided to obtain a plurality of new second image blocks of a smaller size to form a new second image.

Step of Re-Computing the Disparity Values

Then, in the step of re-computing the disparity values, the processor 10 compares the plurality of new first image blocks within the range of the expanded first region with the plurality of aforementioned new second image blocks in the new second image according to the aforementioned disparity value computing method, to obtain a disparity value of each first image block in the new first image blocks. For example, the processor 10 compares the plurality of new first image blocks with the plurality of corresponding new second image blocks in the aforementioned new second image to obtain a plurality of new disparity values respectively corresponding to the plurality of new first image blocks, and generates a new disparity image including the plurality of new disparity values. A computing method of the disparity values and the aforementioned new disparity image are similar to the foregoing embodiments of FIG. 3 and FIG. 4B, and the descriptions thereof are omitted herein.

Step of Redefining the Foreground

After the new disparity value of each block in the new first image blocks is computed, in the step of redefining the foreground, the processor 10 compares the new disparity value of each block in the new first image blocks with the aforementioned first threshold to generate a new disparity depth image in the same way as the above step of defining the foreground, selects at least one new selected block, of which the new disparity value is greater than or equal to the first threshold, from the disparity depth image to form a new first region, then superimposes and maps the new first region including the new selected block to the first image, and identifies another mapped object if any as the foreground object of the first image. This step is similar to the aforementioned embodiment of FIG. 4A to FIG. 4C, so the descriptions thereof are omitted herein.

Figure 7:
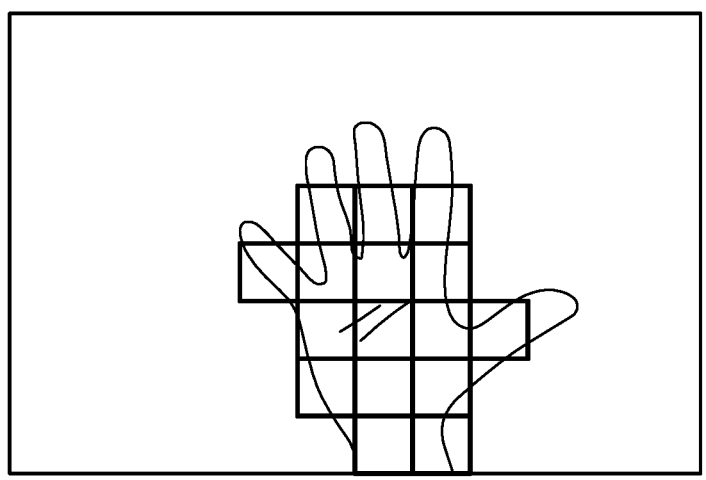
FIG. 7 is a schematic diagram of a foreground redefined according to an embodiment of the present invention.

FIG. 7 is a schematic diagram of a foreground redefined according to an embodiment of the present invention.

Referring to FIG. 7, it is assumed that the processor 10 determines the aforementioned new selected block using the disparity values of 25 blocks in FIG. 6B. If the disparity values of only the new selected blocks in FIG. 7 in the 25 blocks of FIG. 6B are greater than or equal to the first threshold, a region formed by the new selected blocks in FIG. 7 is the aforementioned new first region. The new first region is mapped to the first image to identify a larger range of foreground object. It may be clearly learned that the foreground object identified in FIG. 7 is more accurate than the foreground object identified in FIG. 4C.

After the processor 10 maps pixels of the new first region in the new first image and identifies the pixels as the foreground object of the first image, the processor 10 may generate, for example, a foreground object image according to the pixels of the new first region and output the foreground object image. The processor 10 may further input the foreground object image into a classifier (not shown) to identify the object in the foreground object image. The classifier may output, for example, an identification result, which is used to indicate whether the object in the foreground object image is a specific object (for example, a palm) or an object in a specific shape (for example, a palm with five fingers open).

Figure 8A:
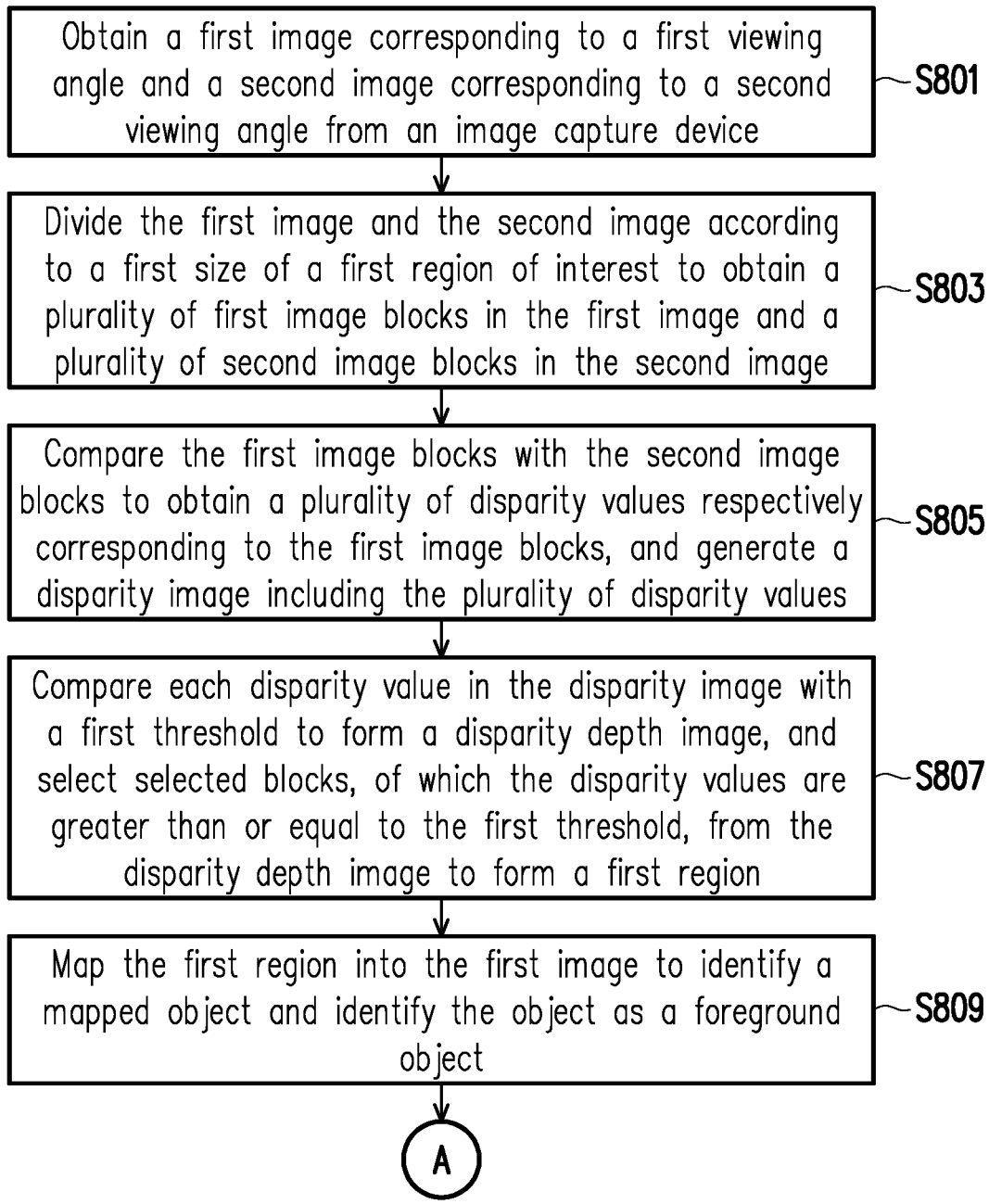
FIG. 8A and FIG. 8B are schematic flowcharts of a method for identifying a foreground object in an image according to an embodiment of the present invention.
Figure 8B:
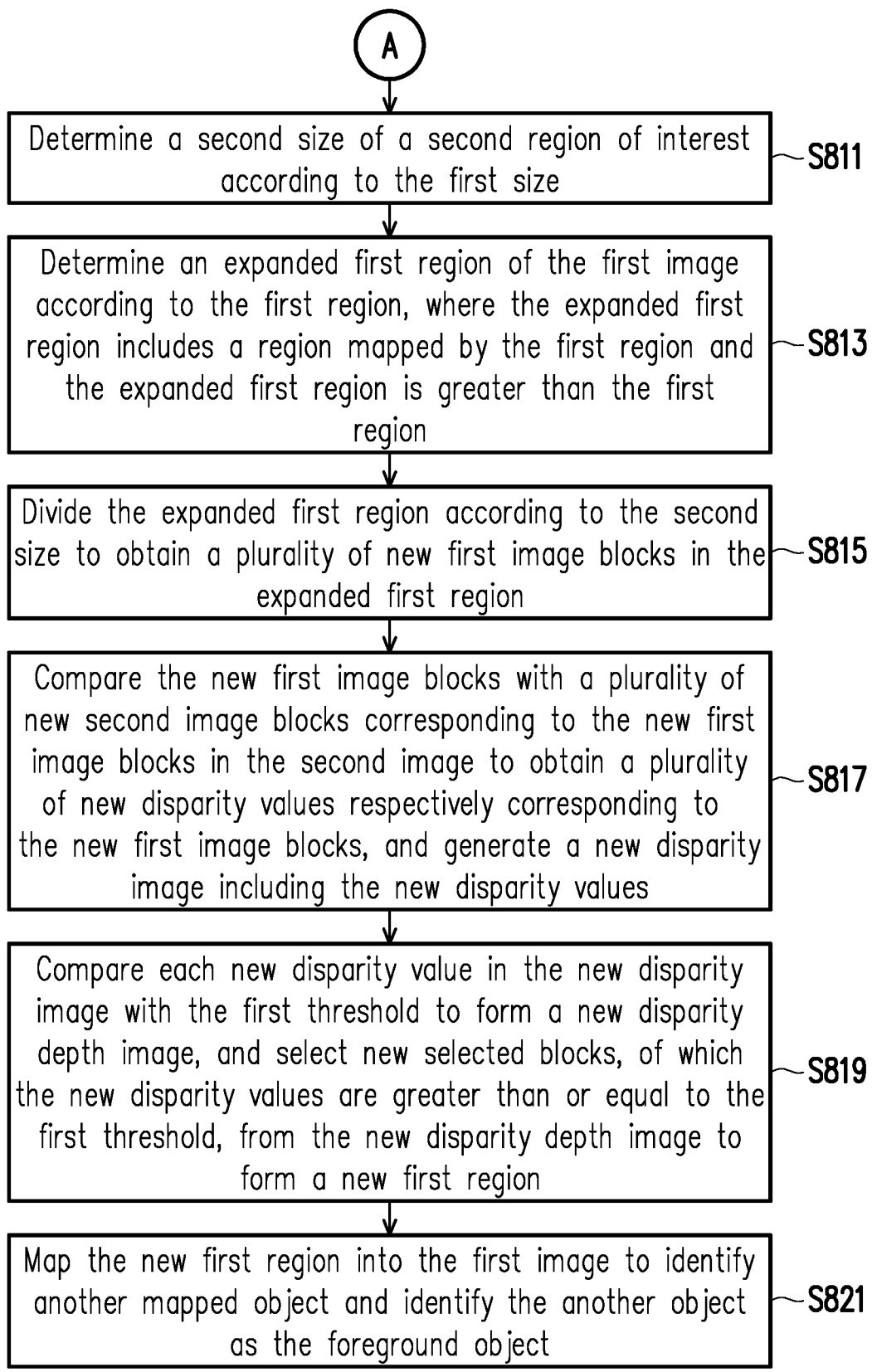

FIG. 8A and FIG. 8B are schematic flowcharts of a method for identifying a foreground object in an image according to an embodiment of the present invention.

Referring to FIG. 8A, in step S801, the processor 10 obtains a first image corresponding to a first viewing angle and a second image corresponding to a second viewing angle from an image capture device. In step S803, the processor 10 divides the first image and the second image according to a first size of a first region of interest to obtain a plurality of first image blocks in the first image and a plurality of second image blocks in the second image. In step S805, the processor 10 compares the first image blocks with the second image blocks to obtain a plurality of disparity values respectively corresponding to the first image blocks, and generates a disparity image including the plurality of disparity values. In step S807, the processor 10 compares each disparity value in the disparity image with a first threshold to form a disparity depth image, and selects selected blocks, of which the disparity values are greater than or equal to the first threshold, from the disparity depth image to form a first region. In step S809, the processor 10 maps the first region into the first image to identify a mapped object and identifies the object as a foreground object. Thereafter, referring to FIG. 8B, in step S811, the processor 10 determines a second size of a second region of interest according to the first size. In step S813, the processor 10 determines an expanded first region of the first image according to the first region, where the expanded first region includes a region mapped by the first region in the first image and the expanded first region is greater than the first region. In step S815, the processor 10 divides the expanded first region according to the second size to obtain a plurality of new first image blocks in the expanded first region. In step S817, the processor 10 compares the new first image blocks with a plurality of new second image blocks corresponding to the new first image blocks in the new second image to obtain a plurality of new disparity values respectively corresponding to the new first image blocks, and generates a new disparity image including the new disparity values. In step S819, the processor 10 compares each new disparity value in the new disparity image with the first threshold to form a new disparity depth image, and selects selected blocks, of which the disparity values are greater than or equal to the first threshold, from the new disparity depth image to form a new first region. In step S821, the processor 10 maps the new first region into the first image to identify another mapped object and identifies the other object as a foreground object.

The identification method of the present invention is described using the steps of FIG. 8 as an example, and the steps are executed by reading program codes of a software/firmware program. In other words, the program codes of the present invention at least may be concluded according to different functions executed to include software program modules such as a region of interest size determination module, an image division module, a disparity comparison module, a disparity depth image forming module, a foreground object identification module and an expanded comparison region module.

Based on the above, the method for identifying a foreground object in an image according to the present invention may divide the image by using a region of interest of a predetermined size, generate a disparity depth image by means of disparity values, and then map the image to the original image to quickly obtain the approximate location of the foreground object in the image. Further, the expanded region formed according to the foreground after the found disparity depth image is superimposed to the original image and the blocks extended around the foreground is re-divided with a region of interest of a smaller size, and then a more accurate foreground object is obtained by means of disparity values. Therefore, the method for identifying a foreground object in an image according to the present invention may identify the foreground object in the image quickly.

Although the present invention has been disclosed as above with the embodiments, it is not intended to limit the present invention. Any person of ordinary skill in the art can make some changes and modifications without departing from the spirit and scope of the present invention. Therefore, the protection scope of the present invention shall be defined by the appended claims.

What is claimed is:

1. A method for identifying a foreground object in an image, applied to an electronic device, the method comprising:

capturing images of an object from an image capture device to obtain a first image corresponding to a first viewing angle and a second image corresponding to a second viewing angle, the first viewing angle being different from the second viewing angle;

dividing the first image and the second image according to a first size of a first region of interest to obtain a plurality of first image blocks in the first image and a plurality of second image blocks in the second image;

comparing the plurality of first image blocks with the plurality of second image blocks to obtain a plurality of disparity values respectively corresponding to the plurality of first image blocks, and generating a disparity image comprising the plurality of disparity values;

comparing each of the plurality of disparity values in the disparity image with a first threshold to form a disparity depth image, and selecting at least one selected block, of which the disparity value is greater than or equal to the first threshold, from the disparity depth image to form a first region; and mapping the first region into the first image to identify a mapped object and identify the object as a foreground object.

2. The method for identifying a foreground object in an image according to claim 1, further comprising:

determining an expanded first region of the first image according to the first region, wherein the expanded first region comprises a region mapped by the first region in the first image and the expanded first region is greater than the first region.

3. The method for identifying a foreground object in an image according to claim 2, further comprising:

determining a second size of a second region of interest according to the first size;

dividing the expanded first region according to the second size to obtain a plurality of new first image blocks in the expanded first region;

comparing the plurality of new first image blocks with a plurality of new second image blocks corresponding to the plurality of new first image blocks in the second image to obtain a plurality of new disparity values respectively corresponding to the plurality of new first image blocks, and generating a new disparity image comprising the plurality of new disparity values;

comparing each of the plurality of new disparity values in the new disparity image with the first threshold to form a new disparity depth image, and selecting at least one new selected block, of which the new disparity value is greater than or equal to the first threshold, from the new disparity depth image to form a new first region; and mapping the new first region into the first image to identify another mapped object and identify the another object as the foreground object.

4. The method for identifying a foreground object in an image according to claim 1, wherein the image capture device comprises a first lens and a second lens, the first threshold is obtained according to a lens spacing, a focal length and an object distance, the lens spacing is a distance between the first lens and the second lens, the focal length is a focal length used by the first lens and the second lens when shooting and obtaining the first image and the second image, and the object distance is a distance between the object and the image capture device.

5. The method for identifying a foreground object in an image according to claim 4, wherein the first threshold is equal to a quotient of a first value divided by the object distance, and the first value is a product obtained by multiplying the lens spacing by the focal length.

6. The method for identifying a foreground object in an image according to claim 3, wherein the second size is less than the first size.

7. The method for identifying a foreground object in an image according to claim 2, wherein the expanded first region comprises part of or all of at least one disparity block adjacent to an edge of a region mapped by the first region in the plurality of first image blocks, and the region mapped by the first region does not comprise the disparity block.

8. The method for identifying a foreground object in an image according to claim 1, wherein the step of comparing the plurality of first image blocks with the plurality of second image blocks is a step of comparing block information of the plurality of first image blocks and the plurality of second image blocks, and the block information is a greyscale value or a colour value of a colour space.

9. An electronic device, comprising:
an image capture device, configured to capture images of an object to obtain a first image corresponding to a first viewing angle and a second image corresponding to a second viewing angle, the first viewing angle being different from the second viewing angle; and
a processor, configured to read at least one program code to execute the following procedure:
dividing the first image and the second image according to a first size of a first region of interest to obtain a plurality of first image blocks in the first image and a plurality of second image blocks in the second image;
comparing the plurality of first image blocks with the plurality of second image blocks to obtain a plurality of disparity values respectively corresponding to the plurality of first image blocks, and generating a disparity image comprising the plurality of disparity values;
comparing each of the plurality of disparity values in the disparity image with a first threshold to form a disparity depth image, and selecting at least one selected block, of which the disparity value is greater than or equal to the first threshold, from the disparity depth image to form a first region; and
mapping the first region into the first image to identify a mapped object and identify the object as a foreground object.

10. The electronic device according to claim 9, wherein the processor is further configured to execute the following procedure:
determining an expanded first region of the first image according to the first region, wherein the expanded first region comprises a region mapped by the first region in the first image and the expanded first region is greater than the first region.

11. The electronic device according to claim 10, wherein the processor is further configured to execute the following procedure:
determining a second size of a second region of interest according to the first size,
the processor is further configured to divide the expanded first region according to the second size to obtain a plurality of new first image blocks in the expanded first region,
the processor is further configured to compare the plurality of new first image blocks with a plurality of new second image blocks corresponding to the plurality of new first image blocks in the second image to obtain a plurality of new disparity values respectively corresponding to the plurality of new first image blocks, and generate a new disparity image comprising the plurality of new disparity values,
the processor is further configured to compare each of the plurality of new disparity values in the new disparity image with the first threshold to form a new disparity depth image, and select at least one new selected block, of which the new disparity value is greater than or equal to the first threshold, from the new disparity depth image to form a new first region, and
the processor is further configured to map the new first region into the first image to identify another mapped object and identify the another object as the foreground object.

12. The electronic device according to claim 11, wherein the image capture device comprises a first lens and a second lens, the first threshold is obtained according to a lens spacing, a focal length and an object distance, the lens spacing is a distance between the first lens and the second lens, the focal length is a focal length used by the first lens and the second lens when shooting and obtaining the first image and the second image, and the object distance is a distance between the object and the image capture device.

13. The electronic device according to claim 12, wherein the first threshold is equal to a quotient of a first value divided by the object distance, and the first value is a product obtained by multiplying the lens spacing by the focal length.

14. The electronic device according to claim 11, wherein the second size is less than the first size.

15. The electronic device according to claim 10, wherein the expanded first region comprises part of or all of at least one disparity block adjacent to an edge of a region mapped by the first region in the plurality of first image blocks, and the region mapped by the first region does not comprise the disparity block.

16. The electronic device according to claim 9, wherein the step of comparing the plurality of first image blocks with the plurality of second image blocks is a step of comparing block information of the plurality of first image blocks and the plurality of second image blocks, and the block information is a grey-scale value or a colour value of a colour space.

17. An electronic device, comprising:
- an image capture device, configured to capture images of an object to obtain a first image corresponding to a first viewing angle and a second image corresponding to a second viewing angle, the first viewing angle being different from the second viewing angle;
- an image division module, configured to divide the first image and the second image according to a first size of a first region of interest to obtain a plurality of first image blocks in the first image and a plurality of second image blocks in the second image;
- a disparity comparison module, configured to compare the plurality of first image blocks with the plurality of second image blocks to obtain a plurality of disparity values respectively corresponding to the plurality of first image blocks, and generate a disparity image comprising the plurality of disparity values;
- a disparity depth image forming module, configured to compare each of the plurality of disparity values in the disparity image with a first threshold to form a disparity depth image, and select at least one selected block, of which the disparity value is greater than or equal to the first threshold, from the disparity depth image to form a first region; and
- a foreground object identification module, configured to map the first region into the first image to identify a mapped object and identify the object as a foreground object.

* * * * *